United States Patent
Wei et al.

(10) Patent No.: US 11,177,976 B2
(45) Date of Patent: Nov. 16, 2021

(54) METHOD AND DEVICE FOR AUTOMATICALLY IMPLEMENTING IOAM ENCAPSULATION AND STORAGE MEDIUM

(71) Applicant: ZTE CORPORATION, Guangdong (CN)

(72) Inventors: Yuehua Wei, Guangdong (CN); Min Xiao, Guangdong (CN); Ran Chen, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 48 days.

(21) Appl. No.: 16/614,449

(22) PCT Filed: May 15, 2018

(86) PCT No.: PCT/CN2018/086834
§ 371 (c)(1),
(2) Date: Nov. 18, 2019

(87) PCT Pub. No.: WO2018/210225
PCT Pub. Date: Nov. 22, 2018

(65) Prior Publication Data
US 2020/0204401 A1 Jun. 25, 2020

(30) Foreign Application Priority Data
May 18, 2017 (CN) .......................... 201710352927.5

(51) Int. Cl.
*H04L 12/24* (2006.01)
*H04L 12/46* (2006.01)
(Continued)

(52) U.S. Cl.
CPC ...... *H04L 12/4633* (2013.01); *H04L 41/0246* (2013.01); *H04L 41/04* (2013.01);
(Continued)

(58) Field of Classification Search
CPC . H04L 12/46–14695; H04L 2012/5625; H04L 2212/00; H04L 29/02–0617;
(Continued)

(56) References Cited

U.S. PATENT DOCUMENTS

| | | | |
|---|---|---|---|
| 2017/0111209 A1* | 4/2017 | Ward | H04L 69/22 |
| 2018/0278548 A1* | 9/2018 | Pignataro | H04L 43/18 |
| 2018/0331933 A1* | 11/2018 | Song | H04L 29/0653 |

FOREIGN PATENT DOCUMENTS

| | | |
|---|---|---|
| CN | 104486119 A | 4/2015 |
| CN | 103609066 B | 4/2017 |

OTHER PUBLICATIONS

European Patent Office, Extended European Search Report dated Jan. 29, 2021 regarding EP18801533.3.

(Continued)

*Primary Examiner* — Timothy J Weidner
(74) *Attorney, Agent, or Firm* — Li & Cai Intellectual Property (USA) Office (57) ABSTRACT

Disclosed are a method and a device for automatically implementing IOAM encapsulation, and a storage medium. The method comprises: sending, at an IOAM ingress node, a first message carrying IOAM configuration request information to an IOAM centralized configuration point; receiving, at the IOAM ingress node, a second message carrying IOAM configuration information of IOAM transmission nodes sent from the IOAM centralized configuration point; and performing, at the IOAM ingress node, IOAM encapsulation on a service data message according to the IOAM configuration information of the IOAM transmission nodes.

17 Claims, 6 Drawing Sheets

(51) Int. Cl.
*H04L 12/70* (2013.01)
*H04L 29/06* (2006.01)
*H04L 29/08* (2006.01)

(52) U.S. Cl.
CPC ...... *H04L 41/0631* (2013.01); *H04L 41/0806* (2013.01); *H04L 41/0886* (2013.01); *H04L 41/0893* (2013.01); *H04L 67/2804* (2013.01); *H04L 69/06* (2013.01); *H04L 69/26* (2013.01); *H04L 2012/5625* (2013.01); *H04L 2212/00* (2013.01)

(58) Field of Classification Search
CPC ......... H04L 29/08–08144; H04L 41/02–5096; H04L 43/10–106; H04L 67/28–2804; H04L 69/02–40
See application file for complete search history.

(56) References Cited

OTHER PUBLICATIONS

F Brockners, et al., "Proof of Transit; draft-brockners-proof-of-transit-03.txt "issued on Mar. 13, 2017, Network Working Group, Internet-Draft.
F Brockners, et al., "Encapsulations for In-situ OAM Data" issued on Mar. 13, 2017, ippm, Internet-Draft.
Jurjen Schonwalder, et al., "Network configuration management using NETCPMF and YANG" issued on Sep. 2, 2010, IEEE Communications Magazine.
China Patent Office, First Office Action dated Jun. 23, 2021 regarding CN201710352927.5.
F. Brockners, et al., "Proof of Transit; draft-brockners-proof-of-transit-03" issued on Mar. 13, 2017, Network Working Group, Internet-Draft.
F. Brockners, et al., "Encapsulations for In-situ OAM Data draft-brockners-inband-oam-transport-03" issued on Mar. 12, 2017, ippm, Internet-Draft.

* cited by examiner

| Type<br>(IOAM configuration information) | Length<br>(Length of the TLV) |
|---|---|
| Identifier of IOAM transmission node 1 | Length of the data list [0] |
| Sub-Type<br>(Code of IOAM Function 1) | Length<br>(Length of the Sub-TLV) |
| Value<br>(Configuration parameter value associated with IOAM function 1) ||
| Sub-Type<br>(Code of IOAM function 2) | Length<br>(Length of the Sub-TLV) |
| Value<br>(Configuration parameter value associated with IOAM function 2) ||
| ... ||
| Identifier of IOAM transmission node 2 | Length of the data list [1] |
| Sub-Type<br>(Code of IOAM function 1) | Length<br>(Length of the Sub-TLV) |
| Value<br>(Configuration parameter value associated with IOAM function 1) ||
| Sub-Type<br>(Code of IOAM function 2) | Length<br>(Length of the Sub-TLV) |
| Value<br>(Configuration parameter value associated with IOAM function 2) ||
| ... ||
| ... ||

Data list [0]

Data list [1]

Data list [2]...

METHOD AND DEVICE FOR AUTOMATICALLY IMPLEMENTING IOAM ENCAPSULATION AND STORAGE MEDIUM

CROSS-REFERENCE TO RELATED APPLICATIONS

The present application is based on and claims the priority of Chinese patent application No. 201710352927.5, filed on May 18, 2017, the entirety of which is incorporated herein by reference.

FIELD OF THE INVENTION

The present disclosure relates to the field of communications, and in particular, to a method and a device for automatically implementing IOAM (In-situ Operations, Administration and Maintenance or In-band Operations, Administration and Maintenance) encapsulation, and a storage medium.

BACKGROUND

IOAM is a new technology of data communication network operation, administration and maintenance (OAM) proposed in the industry, which is currently subjected to a rapid development stage under the joint promotion of the industry. The standardization work is being performed by the Internet Engineering Task Force (IETF) of International Standardization Organization.

IOAM series proposals of IETF "draft-brockners-inband-oam-requirements, draft-brockners-inband-oam-transport" and "draft-brockners-inband-oam-data" describes demand source, encapslution format and data content of the IOAM, respectively. Compared with Out-of-band OAM (Operations, Administration and Maintenance) which has been standardized and widely deployed in a data communication network, the IOAM is characterized in that IOAM data contents are encapsulated into service data messages and transmitted in the network as a part of the service data messages. The Out-of-band OAM data contents are encapsulated into specially constructed Out-of-band OAM data messages and transmitted in the network as separate protocol messages. As a supplement to the Out-of-band OAM, the IOAM may implement some functions that the Out-of-band OAM cannot implement, such as detection of a network Node through which a service data message actually passes, verification of whether a transmission path of the service data is consistent with an expectation, and addition of sequence number information to the service data message to detect packet loss and disorder. Accordingly, in order to implement the above functions, a network administrator needs to configure an IOAM transmission Node including an IOAM Transit Node and an IOAM Egress Node, and the IOAM transmission Node is a Node at which the IOAM data content on the transmission path of the service data message is needed to be processed. Taking into account that an IOAM contains many optional functions and types of service traffic flow carried by the network and transmission paths are variable, the above-described configuration is typically relatively complex and tends to vary.

Figure 1:
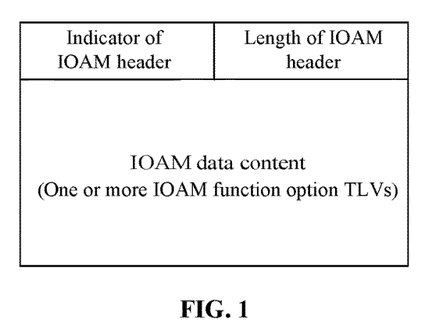
FIG. 1 is a diagram showing a format of an IOAM header according to an embodiment of the present disclosure.

The IOAM encapsulation is to insert an IOAM Header into a service data message. FIG. 1 is a diagram showing a format of an IOAM Header. As shown in FIG. 1, the IOAM Header is used to indicate a position (an indicator of the IOAM Header in FIG. 1) and a Length (a length of the IOAM Header in FIG. 1) of IOAM data content, and also carries a set of IOAM function option types/lengths/values (TLVs, Type/Length/Value) as IOAM data content, wherein each IOAM function option TLV corresponds to an IOAM function and carries data required for completing the IOAM function. The Node in the network that is responsible for IOAM encapsulation, i.e., the Node into which the IOAM header is inserted, is called an IOAM ingress node. The IOAM ingress node may be a network Node such as a switch or a router, or a network terminal such as a personal computer or a server. Since the IOAM header is inserted at the IOAM ingress node, there is a need to determine IOAM function option TLVs included in the IOAM data content and a length of each IOAM function option TLV. These pieces of information are determined by a network administrator according to the configuration conditions on IOAM transmission nodes and are delivered to the IOAM ingress node. As stated above, since the configuration at the IOAM transmission node is typically relatively complex and tends to vary, the method of implementing IOAM encapsulation by manually delivering information at the IOAM ingress node increases the burden on the network administrator and is prone to errors.

SUMMARY

In order to address the above technical problems, embodiments of the disclosure provide a method and a device for automatically implementing IOAM encapsulation, and a storage medium.

According to an embodiment of the disclosure, there is provided a method for automatically implementing in-band operation administration maintenance (IOAM) encapsulation, including: sending, at an IOAM ingress node, a first message carrying IOAM configuration request information to an IOAM centralized configuration point; receiving, at the IOAM ingress node, a second message carrying IOAM configuration information of IOAM transmission nodes sent from the IOAM centralized configuration point; and performing, at the IOAM ingress node, IOAM encapsulation on a service data message according to the IOAM configuration information of the IOAM transmission nodes.

According to an embodiment of the disclosure, there is provided a device for automatically implementing IOAM encapsulation, including: a sending unit, configured to send a first message carrying IOAM configuration request information to an IOAM centralized configuration point; a receiving unit, configured to receive a second message carrying IOAM configuration information of IOAM transmission nodes sent from the IOAM centralized configuration point; and an encapsulating unit, configured to perform IOAM encapsulation on a service data message according to the IOAM configuration information of the IOAM transmission nodes.

According to an embodiment of the disclosure, there is provided a storage medium, storing computer programs, wherein the computer programs are configured to perform the method for automatically implementing IOAM encapsulation as stated above.

In the technical scheme of the embodiment of the disclosure, an IOAM ingress node sends a first message carrying IOAM configuration request information to an IOAM centralized configuration point; the IOAM ingress node receives a second message carrying the IOAM configuration information of each IOAM transmission node sent from the IOAM centralized configuration point; and the IOAM ingress node performs IOAM encapsulation on the service data message according to the IOAM configuration information of each IOAM transmission node. In such a manner, the problems in the related art that the method of implementing IOAM encapsulation by manually delivering information at the IOAM ingress node increases the burden on the network administrator and is prone to errors can be solved, and meanwhile, the IOAM ingress node can support automatic acquisition of information required by IOAM encapsulation under the triggering of service traffic flow.

BRIEF DESCRIPTION OF THE DRAWINGS

Embodiments discussed herein are generally illustrated in accompanying figures by way of example rather than limitation.

DETAILED DESCRIPTION OF THE EMBODIMENTS

In order to further understand the features and technical contents of the embodiments of the present disclosure, the embodiments of the present disclosure will be described below in detail with reference to the accompanying figures. The accompanying figures are provided for illustrative purposes only and are not intended to limit the embodiments of the present disclosure.

Figure 2:
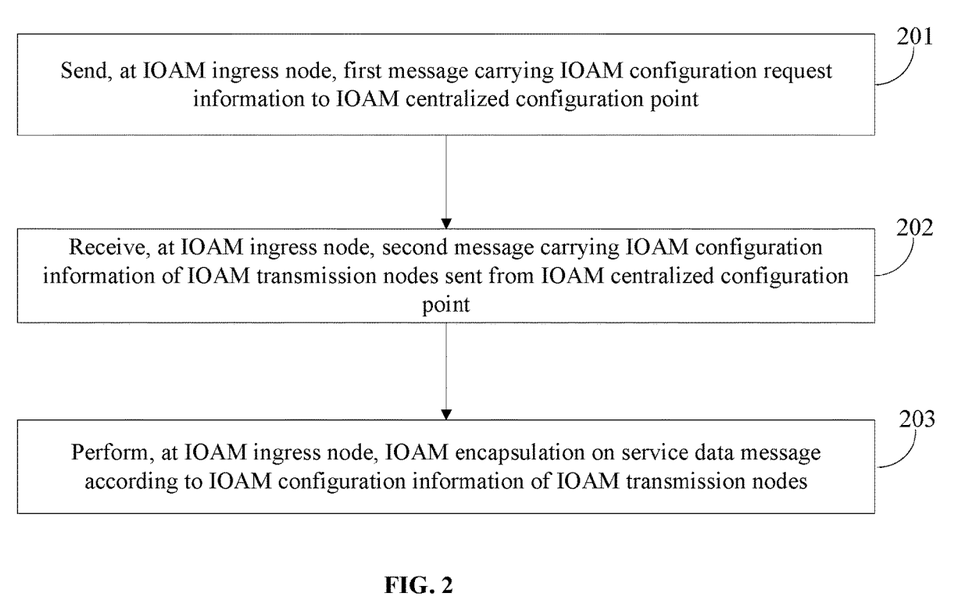
FIG. 2 is a first flowchart schematically showing a method for automatically implementing IOAM encapsulation according to an embodiment of the present disclosure.

FIG. 2 is a first flowchart schematically showing a method for automatically implementing IOAM encapsulation according to an embodiment of the present disclosure. As shown in FIG. 2, the method for automatically implementing IOAM encapsulation includes the following steps.

Step 201: sending, at an IOAM ingress node, a first message carrying IOAM configuration request information to an IOAM centralized configuration point.

In the embodiment of the present disclosure, the method further includes:

obtaining, at the IOAM ingress node, an identifier of each IOAM transmission nodes on the service data message transmission path; and carrying the IOAM configuration request information together with the identifiers of the IOAM transmission nodes in the first message, wherein the identifier of each IOAM transmission node is configured to indicate the IOAM centralized configuration point is carried in a second message together with the IOAM configuration information of the IOAM transmission node corresponding to the identifier of the IOAM transmission node.

Here, the IOAM ingress node obtains the identifier of each IOAM transmission node on the service data message transmission path by running a routing protocol and a signaling protocol, and the IOAM ingress node sends the identifier of the IOAM transmission node together with the IOAM configuration request information to the IOAM centralized configuration point.

In the embodiment of the disclosure, when a trigger operation is obtained from a network administrator, the IOAM ingress node sends the first message carrying IOAM configuration request information to the IOAM centralized configuration point; or When a triggering instruction is obtained from a network management module or a control application, the IOAM ingress node sends the first message carrying IOAM configuration request information to the IOAM centralized configuration point; or When a trigger is obtained from the service data message, the IOAM ingress node sends the first message carrying IOAM configuration request information to the IOAM centralized configuration point.

Step 202: receiving, at the IOAM ingress node, a second message carrying IOAM configuration information of IOAM transmission nodes sent from the IOAM centralized configuration point.

In the embodiment of the disclosure, the IOAM centralized configuration point stores the IOAM configuration information of each IOAM transmission node, wherein when the IOAM configuration information of the IOAM transmission node changes, the IOAM centralized configuration point updates the IOAM configuration information stored therein.

Step 203: performing, at the IOAM ingress node, IOAM encapsulation on a service data message according to the IOAM configuration information of the IOAM transmission nodes.

In the embodiment of the disclosure, the first message is a request message in which a group of TLVs is provided, wherein in the TLVs, an IOAM configuration request is represented by a type field, a length of the TLV is represented by a length field, and a group of IOAM transmission node identifiers is represented by a value field.

The second message is a response message in which a group of TLVs is provided, wherein in the TLVs, IOAM configuration information is represented by a type field, a length of the TLVs is represented by a length field, and a group of IOAM configuration information is represented by a value field.

In an embodiment, the request message and the response message adopt a first protocol.

The provision of a group of TLVs in the request message means that a group of TLVs is provided in the request message through an option field.

The provision of a group of TLVs in the response message means that a group of TLVs is provided in the response message through an option field.

Specifically, the first protocol may be, but is not limited to, a Dynamic Host Configuration Protocol (DHCP). Accordingly, the first message is a DHCP request message, and a group of TLVs is provided in the DHCP request message through an option field, wherein in the TLVs, an IOAM configuration request is represented by a type field, a length of the TLV is represented by a length field, and a group of IOAM transmission node identifiers is represented by a value field. The second message is a DHCP response message, and a group of TLVs is provided in the DHCP response message through an option field, wherein in the TLVs, IOAM configuration information is represented by a type field, a length of the TLVs is represented by a length field, and a group of IOAM configuration information is represented by a value field. The representation of the group of IOAM configuration information by the value field means that the value field includes one or more data lists and each data list corresponds to the IOAM configuration information of a single IOAM transmission node, wherein in the data list, an IOAM transmission node identifier is represented by a first field, a length of the data list is represented by a second field, and IOAM configuration information is represented by a third field. The third field includes a group of TLVs, wherein in the TLVs, an IOAM function code supported by the IOAM transmission node is represented by a type field, a length of the TLVs is represented by a length field, and configuration information of IOAM function is represented by a value field.

In another embodiment, the request message and the response message adopt a second protocol.

The provision of a group of TLVs in the request message means that a group of TLVs is provided in the request message through an object field.

The provision of a group of TLVs in the response message means that a group of TLVs is provided in the response message through an object field.

Specifically, the second protocol may be, but is not limited to, a Path Computation Element Protocol (PCEP). Accordingly, the first message is a PCEP request message, and a group of TLVs is provided in the PCEP request message through an object field, wherein in the TLVs, an IOAM configuration request is represented by a type field, a length of the TLV is represented by a length field, and a group of IOAM transmission node identifiers is represented by a value field. The second message is a PCEP response message, and a group of TLVs is provided in the PCEP response message through an object field, wherein in the TLVs, IOAM configuration information is represented by a type field, a length of the TLVs is represented by a length field, and a group of IOAM configuration information is represented by a value field. The representation of the group of IOAM configuration information by the value field means that the value field includes one or more data lists and each data list corresponds to the IOAM configuration information of a single IOAM transmission node, wherein in the data list, the IOAM transmission node identifier is represented by a first field, a length of the data list is represented by a second field, and IOAM configuration information is represented by a third field. The third field includes a group of TLVs, wherein in the TLVs, an IOAM function code supported by the IOAM transmission node is represented by a type field, a length of the TLVs is represented by a length field, and configuration information of IOAM function is represented by a value field.

Subsequently, the IOAM ingress node determines IOAM function options TLVs included in IOAM data content and a length of each IOAM function option TLV according to the IOAM configuration information of IOAM transmission nodes; and inserts the IOAM header into the service data message according to the IOAM function options TLVs and the length of each IOAM function option TLV.

Figure 3:
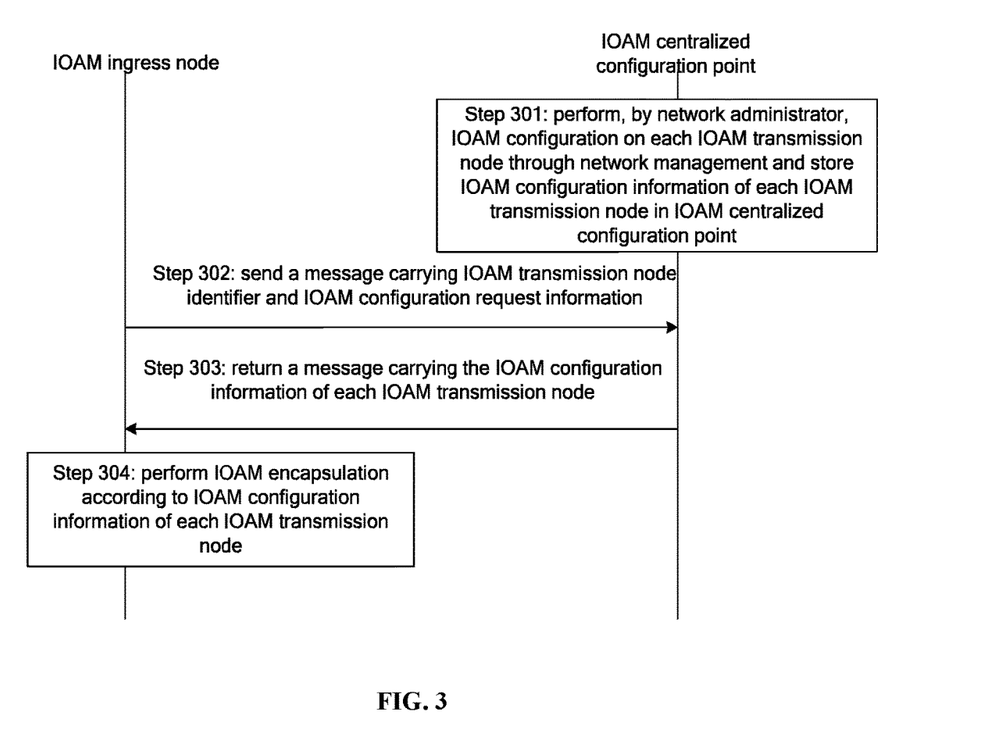
FIG. 3 is a second flowchart schematically showing a method for automatically implementing IOAM encapsulation according to an embodiment of the present disclosure.

FIG. 3 is a second flowchart illustrating a method for automatically implementing IOAM encapsulation according to an embodiment of the present disclosure. As shown in FIG. 3, the method for automatically implementing IOAM encapsulation includes the following steps.

Step 301: performing, by a network administrator, an IOAM configuration on each IOAM transmission node through network management and storing IOAM configuration information of each IOAM transmission node in an IOAM centralized configuration point.

Here, the IOAM centralized configuration point is a device that stores IOAM configuration information of all nodes in the IOAM network domain, and may be configured with a network management or may be an IOAM configuration server connected with the network management.

Step 302: sending, at the IOAM ingress node, a first message carrying an IOAM transmission node identifier and IOAM configuration request information to the IOAM centralized configuration point.

Here, the IOAM ingress node can obtain an identifier of each IOAM transmission node on the service data message transmission path (referred to as an IOAM transmission node identifier for short) by running a routing Protocol (such as an Open Shortest Path First (OSPF) Protocol, and an Intermediate System-to-Intermediate System (IS-IS) Protocol) and a signaling Protocol (such as a Resource Reservation Protocol (RSVP) Protocol and a Label Distribution Protocol (LDP) Protocol). The IOAM ingress node sends the IOAM transmission node identifier together with IOAM configuration request information to the IOAM centralized configuration point.

In the embodiment of the present disclosure, the time when the IOAM ingress node sends the first message carrying the IOAM configuration request information to the IOAM centralized configuration point is very flexible. The first message may be sent under a trigger of the network administrator, or may be sent under a trigger of the network management/control application, or may also be sent under a trigger of the service data message.

Step 303: responding, at the IOAM centralized configuration point, to the request and returning a second message carrying the IOAM configuration information of each IOAM transmission node to the IOAM ingress node.

Here, after receiving the first message carrying the IOAM transmission node identifier and IOAM configuration request information sent from the IOAM ingress node, the IOAM centralized configuration point returns a second message carrying IOAM configuration information of each IOAM transmission node to the IOAM ingress node, wherein the IOAM transmission nodes are nodes corresponding to the IOAM transmission node identifiers sent from the IOAM ingress node. The IOAM configuration information of the IOAM transmission node includes IOAM capabilities supported by the node, and the enabling conditions and related parameter configurations of the IOAM capabilities.

Step 304: performing, at the IOAM ingress node, IOAM encapsulation according to the IOAM configuration information of each IOAM transmission node in the second message.

Here, after obtaining the IOAM configuration of each node on the service data message transmission path, the IOAM ingress node can determine the IOAM function option TLVs included in the IOAM data content and the length of each IOAM function option TLV, and thus IOAM encapsulation can be performed.

The technical solutions of the embodiments of the present disclosure will be further described in detail below with reference to specific application examples.

First Example

Figure 4:
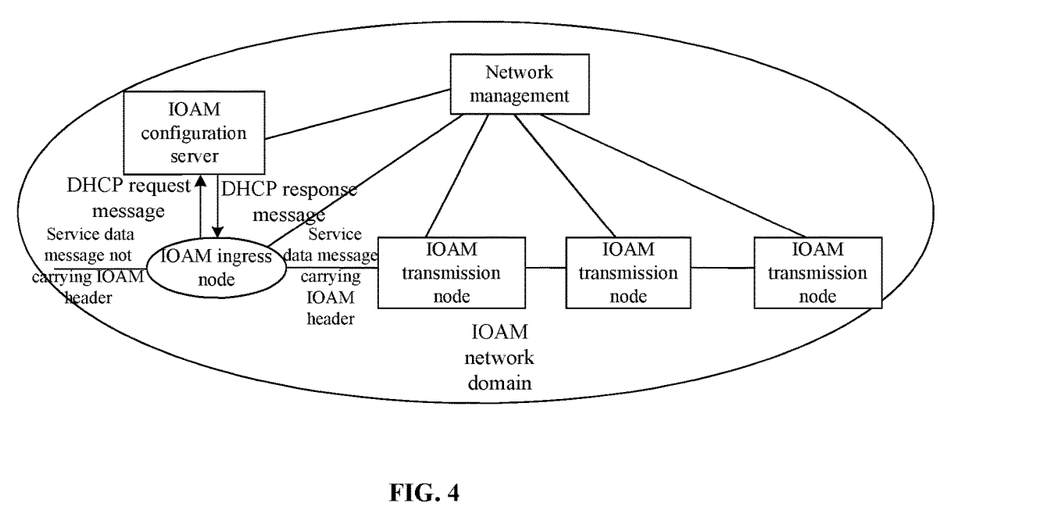
FIG. 4 is a schematic diagram of automatic implementation of IOAM encapsulation by extending DHCP according to an embodiment of the present disclosure.

FIG. 4 is a schematic diagram of automatic implementation of IOAM encapsulation by extending DHCP according to an embodiment of the present disclosure. In this embodiment, the IOAM ingress node and the IOAM centralized configuration point execute the following steps.

Step 11: a network administrator performs IOAM configuration on the IOAM transmission nodes through a network management and stores IOAM configuration information of each IOAM transmission node in an IOAM centralized configuration point.

In this embodiment, the IOAM centralized configuration point is an IOAM configuration server connected to the network management, which also serves as a DHCP server for dynamically allocating IP addresses.

Step 12: an IOAM ingress node sends a DHCP request message carrying an IOAM transmission node identifier and IOAM configuration request information to an IOAM configuration server.

Figure 5:
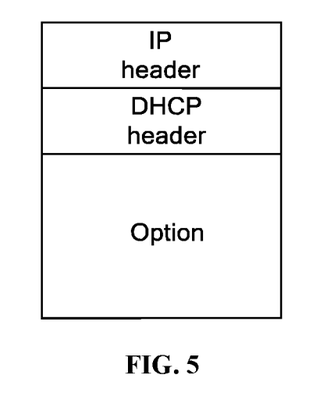
FIG. 5 is a diagram showing a format of a DHCP message according to an embodiment of the present disclosure.

FIG. 5 is a diagram showing a format of a DHCP message. As shown in FIG. 5, the DHCP request message includes a group of Options in form of TLV. The DHCP request message is allowed to carry IOAM transmission node identifiers and IOAM configuration request information by adding a new option TLV, wherein a Type field represents an IOAM configuration request, a Length field represents a Length of the TLV, and a Value field represents a group of IOAM transmission node identifiers.

Step 13: the IOAM configuration server responds to the request and returns a DHCP response message carrying the IOAM configuration information of each IOAM transmission node to the IOAM ingress node.

Figure 6:
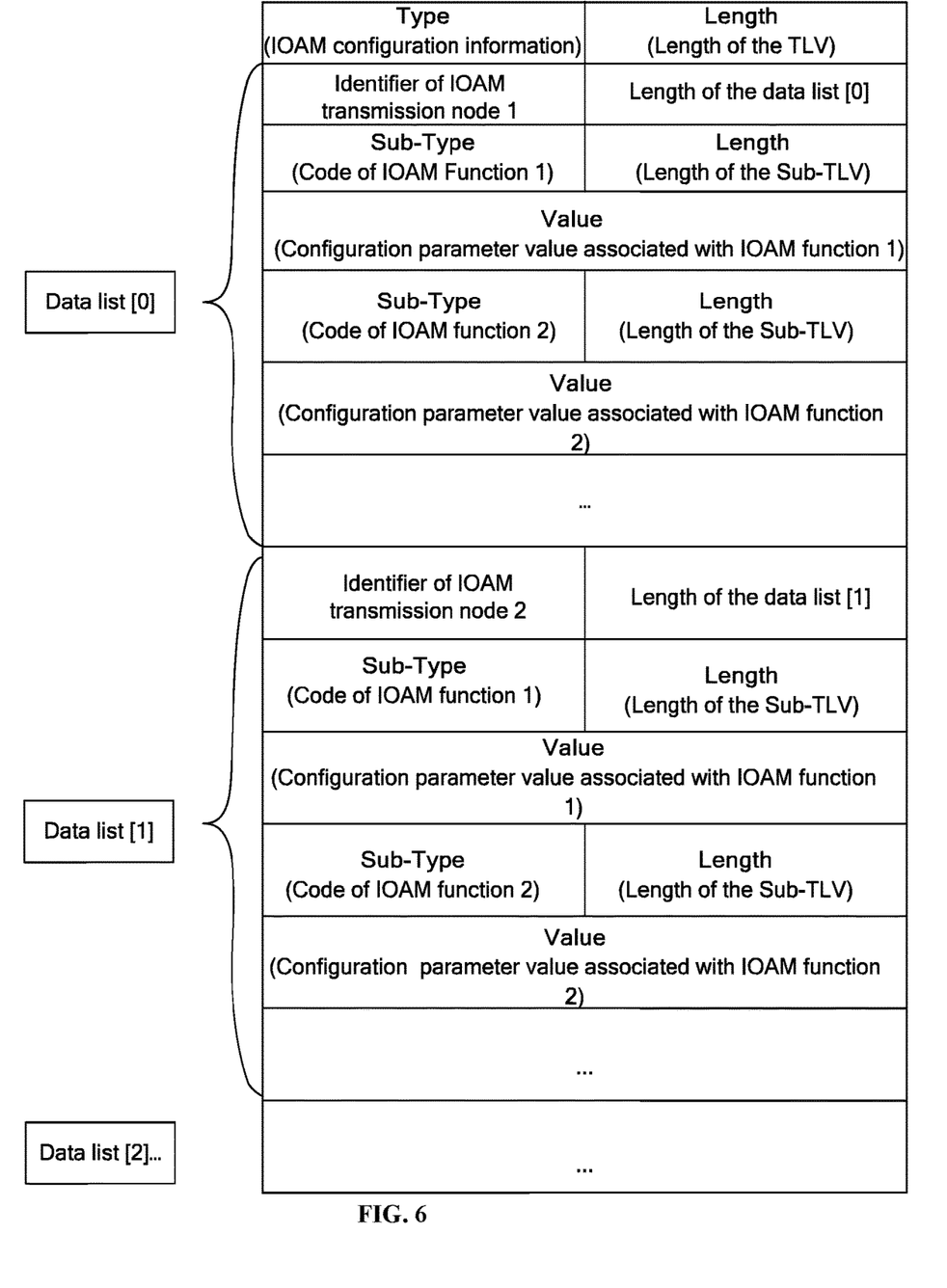
FIG. 6 is a diagram showing a TLV format of an IOAM configuration information according to an embodiment of the present disclosure.

After receiving the DHCP request message carrying the IOAM transmission node identifier and the IOAM configuration request information, the IOAM configuration server returns the DHCP response message carrying the IOAM configuration information of each IOAM transmission node to the node where the DHCP request message is sent (i.e., the IOAM ingress node), in such a manner that the IOAM configuration information may be written into an option field of the DHCP response message in form of TLV. FIG. 6 is a diagram showing a TLV format of an IOAM configuration information. As shown in FIG. 6, the Type field of the TLV represents IOAM configuration information, the Length field represents a Length of the TLV, and the Value field contains a group of information of IOAM configurations. The information contained in the Value field is organized in different structures, which is specifically represented by a data list (DataList). Each DataList carries the IOAM configuration information of a single IOAM transmission node, wherein "IOAM transmission node identifier" is represented by a field, and the length of the DataList is represented by another field. Also, the DataList includes a group of Sub-TLVs, each Sub-TLV carrying configuration information for an IOAM function, wherein a Sub-Type field represents a code of an IOAM function supported by the IOAM transmission node, a Length field represents a Length of the Sub-TLV, a Value field represents the configuration information for the IOAM function represented by the Sub-Type field, including whether the IOAM function is Enabled by the node and configuration parameter values associated with the IOAM function if Enabled. For example, configuration parameters in relation to the IOAM tracking function defined by the IETF proposal draft-brockners-inband-oam-data, include: insert of node information by a Pre-allocated mode or an Incremental mode, and the number of bytes occupied by the node information.

Step 14: after the IOAM ingress node obtains the IOAM configuration information of each IOAM transmission node on the service data message transmission path, IOAM encapsulation is carried out.

After obtaining the IOAM configuration information of each IOAM transmission node on the service data message transmission path, the IOAM ingress node can determine IOAM function option TLVs included in IOAM data content and a length of each IOAM function option TLV, such that the IOAM encapsulation for the service data message can be performed.

Second Example

Figure 7:
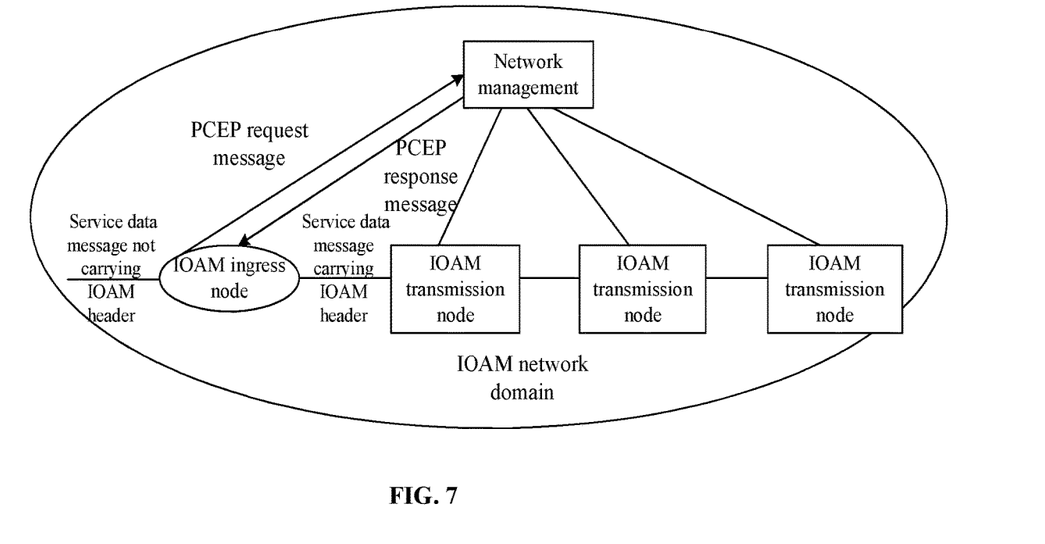
FIG. 7 is a schematic diagram of automatic implementation of IOAM encapsulation by extending PCEP according to an embodiment of the present disclosure.

FIG. 7 is a schematic diagram of automatic implementation of IOAM encapsulation by extending PCEP. In this embodiment, the IOAM ingress node and the IOAM centralized configuration point execute the following steps.

Step 21: a network administrator performs IOAM configuration on IOAM transmission nodes through a network management and stores IOAM configuration information of each IOAM transmission node in an IOAM centralized configuration point.

In this embodiment, the IOAM centralized configuration point is the network management itself.

Step 22: an IOAM ingress node sends a PCEP request message carrying an IOAM transmission node identifier and IOAM configuration request information to the network management.

Figure 8:
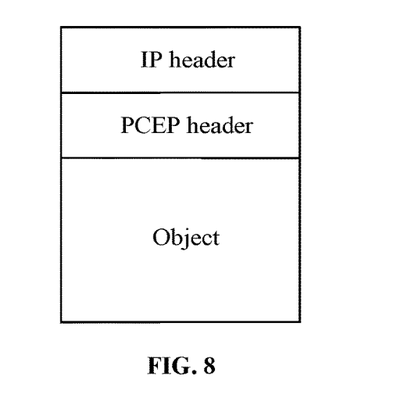
FIG. 8 is a format diagram of a PCEP message according to an embodiment of the present disclosure.

FIG. 8 is a diagram showing a format of a PCEP message. As shown in FIG. 8, the PCEP request message includes a group of Objects in the form of TLV. The PCEP request message is allowed to carry the IOAM transmission node identifiers and IOAM configuration request information by adding a new object TLV, wherein a Type field represents an IOAM configuration request, a Length field represents a Length of the TLV, and a Value field represents a group of IOAM transmission node identifiers.

Step 23: the network management responds to the request and returns a PCEP response message carrying the IOAM configuration information of each IOAM transmission node to the IOAM ingress node.

After receiving the PCEP request message carrying the IOAM transmission node identifier and the IOAM configuration request information, the network management returns the PCEP response message carrying the IOAM configuration information of each IOAM transmission node to the node where the PCEP request message is sent (i.e., the IOAM ingress node), in such a manner that the IOAM configuration information may be written into an object field of the PCEP response message in a format of TLV. The TLV may employ the format as shown in FIG. 6.

Step 24: after the IOAM ingress node obtains the IOAM configuration information of each IOAM transmission node on the service data message transmission path, IOAM encapsulation is carried out.

After obtaining IOAM configuration information of each IOAM transmission node on the service data message transmission path, the IOAM ingress node can determine IOAM function option TLVs included in IOAM data content and a length of each IOAM function option TLV, such that the IOAM encapsulation for the service data message can be performed.

Figure 9:
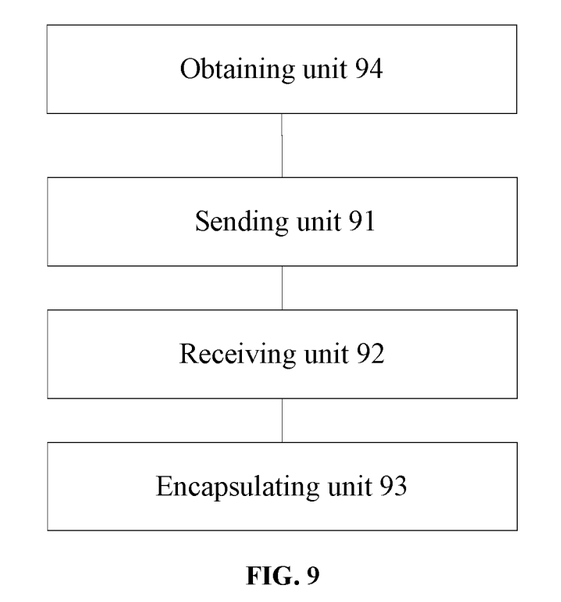
FIG. 9 is a diagram schematically showing a structure of a device for automatically implementing IOAM encapsulation according to an embodiment of the present disclosure.

FIG. 9 is a diagram schematically showing a structure of a device for automatically implementing IOAM encapsulation according to an embodiment of the present disclosure. As shown in FIG. 9, the device includes:

a sending unit 91, configured to send a first message carrying IOAM configuration request information to an IOAM centralized configuration point;

a receiving unit 92, configured to receive a second message carrying IOAM configuration information of IOAM transmission nodes sent from the IOAM centralized configuration point; and an encapsulating unit 93, configured to perform IOAM encapsulation on a service data message according to the IOAM configuration information of the IOAM transmission nodes.

In the embodiment of the present disclosure, the device further includes:

an obtaining unit 94, configured to obtain an identifier of each IOAM transmission node on the service data message transmission path.

The first message carries the IOAM configuration request information together with the identifiers of the IOAM transmission nodes, wherein the identifier of each IOAM transmission node is configured to indicate the IOAM centralized configuration point is carried in a second message together with the IOAM configuration information of the IOAM transmission node corresponding to the identifier of the IOAM transmission node.

In the embodiment of the disclosure, the IOAM centralized configuration point stores the IOAM configuration information of each IOAM transmission node, wherein when the IOAM configuration information of the IOAM transmission node changes, the IOAM centralized configuration point updates the IOAM configuration information stored therein.

In this embodiment of the present disclosure, the sending unit 91 is configured to send the first message carrying IOAM configuration request information to the IOAM centralized configuration point when a trigger operation is obtained from a network administrator; or send the first message carrying IOAM configuration request information to the IOAM centralized configuration point when a triggering instruction is obtained from a network management module or a control application; or send the first message carrying IOAM configuration request information to the IOAM centralized configuration point when the trigger is obtained from the service data message.

In the embodiment of the disclosure, the first message is a request message in which a group of TLVs is provided, wherein in the TLVs, an IOAM configuration request is represented by a type field, a length of the TLV is represented by a length field, and a group of IOAM transmission node identifiers is represented by a value field.

The second message is a response message in which a group of TLVs is provided, wherein in the TLVs, IOAM configuration information is represented by a type field, a length of the TLVs is represented by a length field, and a group of IOAM configuration information is represented by a value field.

In the embodiment of the present disclosure, the request message and the response message adopt a first protocol.

The provision of a group of TLVs in the request message means that a group of TLVs is provided in the request message through an option field.

The provision of a group of TLVs in the response message means that a group of TLVs is provided in the response message through an option field.

In the embodiment of the present disclosure, the request message and the response message adopt a second protocol.

The provision of a group of TLVs in the request message means that a group of TLVs is provided in the request message through an object field.

The provision of a group of TLVs in the response message means that a group of TLVs is provided in the response message through an object field.

In this embodiment of the present disclosure, the representation of the group of IOAM configuration information by the value field means that the value field includes one or more data lists and each data list corresponds to the IOAM configuration information of a single IOAM transmission node, wherein in the data list, an IOAM transmission node identifier is represented by a first field, a length of the data list is represented by a second field, and IOAM configuration information is represented by a third field.

In the embodiment of the present disclosure, the third field includes a group of TLVs, wherein in the TLVs, an IOAM function code supported by the IOAM transmission node is represented by a type field, a length of the TLVs is represented by a length field, and configuration information of IOAM function is represented by a value field.

Those skilled in the art would appreciate that the functional implementation of each unit in the device for automatically implementing IOAM encapsulation shown in FIG. 9 could be understood by referring to the related description of the method for automatically implementing IOAM encapsulation. The function of each unit in the device for automatically implementing IOAM encapsulation as shown in FIG. 9 may be implemented by a program running on a processor, or may be implemented by specific logic circuits.

In practical applications, the functional implementation of each unit in the device for automatically implementing IOAM encapsulation may be completed by a Central Processing Unit (CPU), a Micro Processing Unit (MPU), a Digital Signal Processor (DSP), a Field Programmable Gate Array (FPGA), for example.

Those skilled in the art would appreciate that the embodiments of the present disclosure may be provided as a method, system, or computer program product. Accordingly, the present disclosure may take the form of a hardware embodiment, a software embodiment, or an embodiment combining software and hardware aspects. Furthermore, the present disclosure may take the form of a computer program product embodied on one or more computer-usable storage media (including, but not limited to, disk storage and optical storage, for example) having computer-usable program code.

The present disclosure is described with reference to flowcharts and/or block diagrams of methods, devices (systems), and computer program products according to embodiments of the disclosure. It would be understood that each process and/or block of the flowchart and/or block diagram, and combinations of process and/or blocks in the flowchart and/or block diagram, can be implemented by computer program instructions. These computer program instructions may be provided to a processor of a general purpose computer, special purpose computer, embedded processing machine, or other programmable data processing apparatus to produce a machine, such that the instructions, which executed via the processor of the computer or other programmable data processing apparatus, can create means for implementing the functions specified in one or more process in the flowchart and/or one or more block in the block diagram.

These computer program instructions may also be stored in a computer-readable memory that can boot a computer or other programmable data processing apparatus to operate in a particular manner, such that the instructions stored in the computer-readable memory produce an article including instruction means which implement the function specified in one or more process in the flowchart and/or one or more block in the block diagram.

These computer program instructions may also be loaded onto a computer or other programmable data processing apparatus to cause a series of operational steps to be performed on the computer or other programmable apparatus to produce a computer implemented processing, such that the instructions which executed on the computer or other programmable apparatus provide steps for implementing the function specified in one or more process in the flowchart and/or one or more block in the block diagram.

Accordingly, in an embodiment of the present disclosure, there is further provided a storage medium, in which a computer program is stored, wherein the computer program is configured to execute the method for automatically implementing IOAM encapsulation according to the embodiment of the present disclosure.

Described above are only the preferred embodiments of the present disclosure which are not intended to limit the scope of the present disclosure.

INDUSTRIAL APPLICABILITY

In the technical scheme of the embodiment of the disclosure, an IOAM ingress node sends a first message carrying IOAM configuration request information to an IOAM centralized configuration point; the IOAM ingress node receives a second message carrying the IOAM configuration information of each IOAM transmission node sent from the IOAM centralized configuration point; and the IOAM ingress node performs IOAM encapsulation on the service data message according to the IOAM configuration information of each IOAM transmission node. In such a manner, the problems in the related art that the method of implementing IOAM encapsulation by manually delivering information at the IOAM ingress node increases the burden on the network administrator and is prone to errors can be solved, and meanwhile, the IOAM ingress node can support automatic acquisition of information required by IOAM encapsulation under the triggering of service traffic flow.

What is claimed is:

1. A method for automatically implementing in-band operation administration maintenance (IOAM) encapsulation, comprising:
 sending, at an IOAM ingress node, a first message carrying IOAM configuration request information to an IOAM centralized configuration point;
 receiving, at the IOAM ingress node, a second message carrying IOAM configuration information of IOAM transmission nodes sent from the IOAM centralized configuration point; and
 performing, at the IOAM ingress node, IOAM encapsulation on a service data message according to the IOAM configuration information of the IOAM transmission nodes;
 the method further comprising:
 obtaining, at the IOAM ingress node, an identifier of each IOAM transmission node on a service data message transmission path; and
 carrying the IOAM configuration request information together with the identifiers of the IOAM transmission nodes in the first message,
 wherein the first message is a request message in which a group of TLVs is provided, wherein in the TLVs, an IOAM configuration request is represented by a type field, a length of the TLV is represented by a length field, and a group of IOAM transmission node identifiers is represented by a value field; and
 the second message is a response message in which a group of TLVs is provided, wherein in the TLVs, IOAM configuration information is represented by a type field, a length of the TLVs is represented by a length field, and a group of IOAM configuration information is represented by a value field.

2. The method according to claim 1, wherein the identifier of each IOAM transmission node is configured to indicate the IOAM centralized configuration point carries the IOAM configuration information of the IOAM transmission node corresponding to the identifier of the IOAM transmission node in a second message.

3. The method according to claim 1, wherein the IOAM centralized configuration point stores the IOAM configuration information of each IOAM transmission node, wherein when the IOAM configuration information of the IOAM transmission node changes, the IOAM centralized configuration point updates the IOAM configuration information stored therein.

4. The method according to claim 1, wherein
 when a trigger operation is obtained from a network administrator, the IOAM ingress node sends the first message carrying IOAM configuration request information to the IOAM centralized configuration point; or
 when a triggering instruction is obtained from a network management module or a control application, the IOAM ingress node sends the first message carrying IOAM configuration request information to the IOAM centralized configuration point; or
 when a trigger is obtained from the service data message, the IOAM ingress node sends the first message carrying IOAM configuration request information to the IOAM centralized configuration point.

5. The method according to claim 1, wherein the request message and the response message adopt a first protocol;
 the provision of a group of TLVs in the request message means that a group of TLVs is provided in the request message through an option field; and
 the provision of a group of TLVs in the response message means that a group of TLVs is provided in the response message through an option field.

6. The method according to claim 1, wherein the request message and the response message adopt a second protocol;
 the provision of a group of TLVs in the request message means that a group of TLVs is provided in the request message through an object field; and
 the provision of a group of TLVs in the response message means that a group of TLVs is provided in the response message through an object field.

7. The method according to claim 1, wherein the representation of a group of IOAM configuration information by the value field comprises:
 the value field includes one or more data lists and each data list corresponds to the IOAM configuration information of a single IOAM transmission node, wherein in the data list, an IOAM transmission node identifier is represented by a first field, a length of the data list is represented by a second field, and IOAM configuration information is represented by a third field.

8. The method according to claim 7, wherein the third field comprises a group of TLVs, wherein in the TLVs, an IOAM function code supported by the IOAM transmission node is represented by a type field, a length of the TLVs is represented by a length field, and configuration information of IOAM function is represented by a value field.

9. A device for automatically implementing IOAM encapsulation, comprising:
 a sending unit, configured to send a first message carrying IOAM configuration request information to an IOAM centralized configuration point;
 a receiving unit, configured to receive a second message carrying IOAM configuration information of IOAM transmission nodes sent from the IOAM centralized configuration point; and
 an encapsulating unit, configured to perform IOAM encapsulation on a service data message according to the IOAM configuration information of the IOAM transmission nodes;
 the device further comprising:
 an obtaining unit, configured to obtain an identifier of each IOAM transmission node on a service data message transmission path;
 the first message carries the IOAM configuration request information together with the identifiers of the IOAM transmission nodes,
 wherein the first message is a request message in which a group of TLVs is provided, wherein in the TLVs, an IOAM configuration request is represented by a type field, a length of the TLV is represented by a length field, and a group of IOAM transmission node identifiers is represented by a value field; and
 the second message is a response message in which a group of TLVs is provided, wherein in the TLVs, IOAM configuration information is represented by a type field, a length of the TLVs is represented by a length field, and a group of IOAM configuration information is represented by a value field.

10. The device according to claim 9,
 wherein the identifier of each IOAM transmission node is configured to indicate the IOAM centralized configuration point carries the IOAM configuration information of the IOAM transmission node corresponding to the identifier of the IOAM transmission node in a second message.

11. The device according to claim 9, wherein the IOAM centralized configuration point stores the IOAM configuration information of each IOAM transmission node, wherein when the IOAM configuration information of the IOAM transmission node changes, the IOAM centralized configuration point updates the IOAM configuration information stored therein.

12. The device according to claim 9, wherein the sending unit is configured to send the first message carrying IOAM configuration request information to the IOAM centralized configuration point when a trigger operation is obtained from a network administrator; or send the first message carrying IOAM configuration request information to the IOAM centralized configuration point when a triggering instruction is obtained from a network management module or a control application; or send the first message carrying IOAM configuration request information to the IOAM centralized configuration point when the trigger is obtained from the service data message.

13. The device according to claim 9, wherein the request message and the response message adopt a first protocol;
 the provision of a group of TLVs in the request message means that a group of TLVs is provided in the request message through an option field; and
 the provision of a group of TLVs in the response message means that a group of TLVs is provided in the response message through an option field.

14. The device according to claim 9, wherein the request message and the response message adopt a second protocol;
 the provision of a group of TLVs in the request message means that a group of TLVs is provided in the request message through an object field; and
 the provision of a group of TLVs in the response message means that a group of TLVs is provided in the response message through an object field.

15. The device according to claim 9, wherein the representation of the group of IOAM configuration information by the value field comprises:
 the value field includes one or more data lists and each data list corresponds to the IOAM configuration information of a single IOAM transmission node, wherein in the data list, an IOAM transmission node identifier is represented by a first field, a length of the data list is represented by a second field, and IOAM configuration information is represented by a third field.

16. The device according to claim 15, wherein the third field comprises a group of TLVs, wherein in the TLVs, an IOAM function code supported by the IOAM transmission node is represented by a type field, a length of the TLVs is represented by a length field, and configuration information of IOAM function is represented by a value field.

17. A non-transitory storage medium, storing computer-executable instructions wherein the computer-executable instructions are configured to perform the method for automatically implementing IOAM encapsulation according to claim 1.

* * * * *